US 12,500,019 B2

United States Patent
March et al.

(10) Patent No.: US 12,500,019 B2
(45) Date of Patent: Dec. 16, 2025

(54) METHOD FOR CHARGING A SUPERCONDUCTOR BULK MAGNET BY FIELD-COOLING, WITH AT LEAST ONE NON-HOMOGENEOUS MAGNETIC FIELD COMPONENT OF THE APPLIED CHARGER MAGNETIC FIELD

(71) Applicant: Bruker Switzerland AG, Faellanden (CH)

(72) Inventors: Stephen Alfred March, Zurich (CH); Joerg Hinderer, Waldshut-Tiengen (DE); Frank Borgnolutti, Duebendorf (CH); Kenneth J. Guenter, Zurich (CH)

(73) Assignee: Bruker Switzerland AG, Faellanden (CH)

(*) Notice: Subject to any disclaimer, the term of this patent is extended or adjusted under 35 U.S.C. 154(b) by 958 days.

(21) Appl. No.: 17/687,111

(22) Filed: Mar. 4, 2022

(65) Prior Publication Data
US 2022/0285060 A1    Sep. 8, 2022

(30) Foreign Application Priority Data
Mar. 5, 2021    (EP) ..................... 21161113

(51) Int. Cl.
*H01F 6/00* (2006.01)
*H01F 6/04* (2006.01)
(Continued)

(52) U.S. Cl.
CPC ............. *H01F 6/008* (2013.01); *H01F 6/005* (2013.01); *H01F 6/04* (2013.01); *H01F 6/06* (2013.01); *G01R 33/3815* (2013.01)

(58) Field of Classification Search
CPC . H01F 6/008; H01F 6/005; H01F 6/04; H01F 6/06
See application file for complete search history.

(56) References Cited

U.S. PATENT DOCUMENTS 7,859,374 B2    12/2010    Iwasa et al.
8,947,089 B2    2/2015    Abe et al.
(Continued)

FOREIGN PATENT DOCUMENTS

EP    3128336 A1    8/2016
EP    3492941 A1    6/2019
(Continued)

OTHER PUBLICATIONS

Weinstein et al., "Permanent Magnets Composed of High Temperature Superconductors", Journal of Applied Physics, vol. 70, No. 10, Nov. 15, 1991, pp. 6501-6503.
(Continued)

*Primary Examiner* — Paul A Wartalowicz
(74) *Attorney, Agent, or Firm* — Edell, Shapiro & Finnan, LLC

(57) ABSTRACT

A method for charging a superconductor bulk magnet includes: step a) charging the magnet charger system so as to generate a first magnetic field in the sample volume, the superconductor bulk magnet having a temperature $T>T_c$ (300); step b) cooling the superconductor bulk magnet to a temperature $T<T_c$ (400); step c) discharging the magnet charger system, which inductively charges the superconductor bulk magnet, such that the superconductor bulk magnet traps a second magnetic field in the sample volume (500). In step a), the field adjustment unit is set such that the first
(Continued)

magnetic field generated by the magnet charger system in the sample volume includes a homogeneous magnetic field component and at least one non-homogeneous magnetic field component (300). The non-homogeneous field component is chosen so that the second magnetic field of step c) has a higher homogeneity than the first magnetic field of step a) in the sample volume.

25 Claims, 8 Drawing Sheets

(51) Int. Cl.
*H01F 6/06* (2006.01)
*G01R 33/3815* (2006.01)

(56) References Cited

U.S. PATENT DOCUMENTS

| | | | |
|---|---|---|---|
| 9,666,343 | B2 | 5/2017 | Mallett |
| 10,761,163 | B2 | 9/2020 | Mulder et al. |
| 2011/0210729 | A1 | 9/2011 | Iwasa et al. |
| 2017/0089992 | A1* | 3/2017 | Sakakibara ............. H01F 6/008 |
| 2018/0164388 | A1* | 6/2018 | Guenter ................ H01B 1/026 |
| 2019/0178961 | A1 | 6/2019 | Morita |
| 2020/0161039 | A1 | 5/2020 | Hinderer et al. |
| 2020/0335269 | A1 | 10/2020 | Borgnolutti et al. |
| 2021/0358666 | A1 | 11/2021 | Hinderer et al. |

FOREIGN PATENT DOCUMENTS

| | | |
|---|---|---|
| EP | 3657193 A1 | 5/2020 |
| EP | 3726544 A1 | 10/2020 |
| EP | 3910651 A1 | 11/2021 |
| JP | H09201347 A | 8/1997 |
| JP | 200834692 A | 2/2008 |
| JP | 2009156719 A | 7/2009 |
| JP | 2012101105 A | 5/2012 |
| JP | 2015531170 A | 10/2015 |
| JP | 2019524177 A | 9/2019 |
| JP | 2019169626 A | 10/2019 |
| JP | 2020106521 A | 7/2020 |
| WO | 2015015892 A1 | 2/2015 |

OTHER PUBLICATIONS

Nariki et al., "Development of High-Performance QMG Bulk Magnets for High Magnetic Field Engineering Applications" IEEE Transactions on Applied Superconductivity, vol. 26, No. 3, Apr. 2016, 4 pages.
Kitamura et al., "The Study to Improve the Field Homogeneity of the HTS Bulk Magnets for NMR Relaxometry Device by Passive Compensation Methods" , Physics Procedia 58, Sep. 2014, pp. 298-301.
Kim et al., "Characteristics of the magnetic field distribution on compact NMR magnets using cryocooled HTS bulks", Physica C 469, (May 2009), pp. 1811-1815.
Kim et al., "Study on the Remagnetization Process to Improve the Field Homogeneity of the Stacked HTS Bulk Magnets" IEE Transactions on Applied Superconductivity, vol. 24, No. 3, Jun. 2014, 5 pages.
Fujishiro et al., "Numerical Simulation of Trapped Field Homogeneity in an NMR Superconducting Bulk Magnet after Inserting a High-Jc HTS Thin Cylinder-The influence of the thin cylinder geometry-", vol. 52, No. 1 (2017), 5 pages.
Fujishiro et al., "Drastic improvement of the trapped field homogeneity in a superconducting hollow bulk by the Insertion of a high-Jc superconducting cylinder for NMR bulk magnets", Superconductor Science Technology, 28, Published Aug. 2015, 8 pages.
Deng et al., "Trapped field recovery of bulk superconductor magnets by static field magnetization" , Physica C 471, (May 2011), pp. 1459-1463.
Nakamura et al., "Development of a superconducting bulk magnet for NMR and MRI" Journal of Magnetic Resonance 259 (Jul. 2015), pp. 68-75.

* cited by examiner

| Design | SH | SB | NH | NB |
|---|---|---|---|---|
| A | 140 | 33 | 100 | 40 |
| B | 140 | 40 | No notch | |■
| Dimensions in mm. SD: 60 for both designs | | | | |

SD: Stack diameter
SH: Stack height
SB: Stack bore
NH: Notch height
NB: Notch bore

METHOD FOR CHARGING A SUPERCONDUCTOR BULK MAGNET BY FIELD-COOLING, WITH AT LEAST ONE NON-HOMOGENEOUS MAGNETIC FIELD COMPONENT OF THE APPLIED CHARGER MAGNETIC FIELD

CROSS REFERENCE TO RELATED APPLICATIONS

This application claims foreign priority under 35 U.S.C. § 119(a)-(d) to European Patent Application 21 161 113.2 filed on Mar. 5, 2021, the contents of which are incorporated into the present application by reference in their entirety.

FIELD OF THE INVENTION

The invention relates to a method for charging a superconductor bulk magnet by field-cooling using a magnet charger system.

BACKGROUND

A representative conventional magnet charger system comprises a background charger magnet and a field adjustment unit,
wherein the superconductor bulk magnet comprises a bulk magnet bore, wherein the bulk magnet bore contains a sample volume,
wherein the background charger magnet comprises a charger bore,
wherein the superconductor bulk magnet is arranged within the charger bore, wherein the background charger magnet and the field adjustment unit are arranged radially outside the bulk magnet bore,
and wherein the superconductor bulk magnet has a critical temperature $T_c$.

An associated method includes the steps of:
step a) the magnet charger system is charged, such that after this charging it generates a first magnetic field in the sample volume, wherein the superconductor bulk magnet has a temperature T, with $T>T_c$;
step b) the superconductor bulk magnet is cooled to a temperature $T<T_c$;
step c) the magnet charger system is discharged, what inductively charges the superconductor bulk magnet, such that the superconductor bulk magnet traps a second magnetic field in the sample volume;
before step a), a correlation between a magnetic field applied by the magnet charger system from outside the superconductor bulk magnet and a resulting magnetic field trapped by the superconductor bulk magnet is determined at least approximately in the sample volume,
and wherein in step a), the field adjustment unit is set such that the first magnetic field generated by the magnet charger system in the sample volume comprises a homogeneous magnetic field component and at least one non-homogeneous magnetic field component,
wherein said at least one non-homogeneous field component is chosen, using said correlation, such that the second magnetic field of step c) has a higher homogeneity than the first magnetic field of step a) in the sample volume.

Such a method is known from JP 2009 156719 A.

Superconductors are materials whose electrical resistance vanishes below a critical temperature $T_c$, which is specific for the respective superconductor material. Thus, practically no ohmic losses occur while the superconductors carry an electrical current. To achieve this the superconductors have to be exposed to cryogenic temperatures, though. Superconductors are, for example, used to generate magnetic fields of high strength, in particular for use in particle accelerators or nuclear magnetic resonance (=NMR) applications.

Common superconductor applications use superconductor lines, such as tape shaped or wire shaped superconductor lines. The superconductor lines may be used directly (for example for current transport) or after having been brought in a desired form, for example by winding coils. In particular, superconductor coils for high field applications are typically made from superconductor lines wound in a solenoid type fashion.

However, superconductor bulk magnets are also known. In this case, a superconducting current circulates inside a piece or stacked pieces of superconductor, with the superconductor bulk magnet or its pieces typically being of closed ring shape. Such structures are simple and inexpensive to produce, and are often made from high temperature superconductor (=HTS) material.

Superconductor bulk magnets may be loaded by a procedure called "field-cooling", e.g. described in U.S. Pat. No. 7,859,374 B2. For this procedure, the superconductor bulk magnet is disposed inside the charger bore of an electrical charger magnet, and then the charger magnet is turned on and generates a magnetic field while the superconductor bulk magnet's temperature T is still above $T_c$. Then the superconductor bulk magnet is cooled below $T_c$ and becomes superconducting. Subsequently, with T kept below $T_c$, the charger magnet is turned off. A current is induced thereby in the superconductor bulk magnet, such that the magnetic flux within the superconductor bulk magnet is maintained. In other words, the superconductor bulk magnet traps the magnetic field in its inside. Then the superconductor bulk magnet may be removed from the charger magnet, and may be transported to a place where the trapped magnetic field may be used.

For many applications, such as these NMR applications, a high homogeneity of a magnetic field is desirable. However, the typical magnetic field of a superconductor bulk magnet magnetized via the field-cooling process and provided in its superconductor bore has a relatively low homogeneity.

Since the superconductor bulk magnet traps the magnetic field generated by the charger magnet, in order to obtain a high homogeneity of the trapped magnetic field, generally a high homogeneity of the applied charger magnetic field is aimed at in the state of the art.

In WO 2015/015892 A1, it is proposed to arrange a superconducting bulk to be magnetized within the bore of large magnetization unit, and to further arrange in this bore of the large magnetization unit a magnetic field adjusting unit, with its coils arranged outside about the superconducting bulk. The superconducting bulk is magnetized using both the magnetization unit and the magnetic field adjusting unit, to maximize the homogeneity of the magnetic field applied to the superconductor bulk magnet during charging.

A similar approach is shown in JP 2009 156719 A. A superconductor bulk magnet is arranged in a bore of an external magnetic field applying device, and inside the cryostat of the superconductor bulk magnet, there is arranged a correction coil radially outside the superconductor bulk magnet. With the external magnetic field applying device and the correction coil, a magnetic field as uniform as possible is generated and applied to the superconductor bulk magnet during charging. Here the correction coil has a height smaller than the superconductor bulk magnet.

These measures lead to an improvement of the homogeneity of the trapped magnetic field, but still significant inhomogeneities of the trapped magnetic field may remain even then.

In practice, remaining inhomogeneities of the trapped magnetic field may simply be accepted, or when using the trapped magnetic field e.g. in an NMR experiment, it can be superposed with a correction field generated by a shimming device (e.g. comprising normally conducting coils arranged in the room temperature bore) during use. However, shimming devices make the system more complex and require significant space, which is not always available.

EP 3 492 941 A1 shows a superconductor bulk magnet structure with sections of different inner diameter. After an initial field-cooling step, it is suggested to increase the temperature of the superconductor bulk magnet structure, bringing some sections to magnetic saturation, so superconducting electric currents are redistributed between the sections in order to achieve a more uniform magnetic field. It is in particular possible to use a non-uniform applied magnetic field to charge the superconductor bulk magnet structure.

In EP application 20 174 683.1 (published as EP 3 910 651 A1 on May 14, 2020), it is proposed to individually control the temperature of a plurality of bulk sub-magnets of a superconductor bulk magnet during a part of the field-cooling process, in order to improve the homogeneity of a trapped magnetic field.

EP 3 657 193 A1 proposes to apply an auxiliary magnetic field on the inside of the superconductor bulk magnet during the field-cooling process, wherein a field correction unit is arranged inside the bore of the superconductor bulk magnet. An iterative process for increasing the homogeneity of the trapped magnetic field is suggested.

In EP 3 726 544 A1 it is proposed to use a ferromagnetic shielding body within the cryostat, and to do the field-cooling through the ferromagnetic shielding body. This avoids handling of magnetic forces as compared to an a posteriori installation of the ferromagnetic shielding body, and generally provides an improved position accuracy of the ferromagnetic shielding body, which in turn improves the homogeneity of the trapped magnetic field.

JP 2009 156719 A discloses in its FIG. 5 a field cooling variant wherein the magnetic field A1 generated by the external magnetic field applying device alone drops sharply lateral to the magnetic center at z=0, and so does a corresponding trapped magnetic field A2 which has a 1 ppm uniform magnetic field space of 2×0.75 mm. However, with the external magnetic field applying device and the correction coil together, a magnetic field A3 increasing lateral to the magnetic center is generated, and a resulting trapped magnetic field A4 is highly homogeneous in the vicinity of the magnetic center, having a 1 ppm uniform magnetic field space of 2×7.5 mm.

SUMMARY

It is an object of the present invention to provide a method of magnetizing a superconducting bulk magnet, with which a higher homogeneity of the trapped magnetic field of the superconducting bulk magnet may be achieved in a simple way.

Short Description of Aspects of the Invention

This object is achieved, in accordance with one formulation of the invention, by a method as introduced in the beginning, characterized in that said correlation is chosen with a linear function for each applied non-homogeneous magnetic field component comprised in the first magnetic field and to be adjusted by the field adjustment unit, wherein each linear function is defined by a slope and an offset, and correlates the component strength value of the magnetic field applied with the component strength value of the magnetic field trapped for its non-homogeneous magnetic field component, and that determining said correlation includes at least determining the offset for each linear function by calculation and/or by measurement.

As an overview, the present invention proposes to include a homogeneous and at least one non-homogeneous magnetic field component to the field-cooling process for magnetizing the superconductor bulk magnet. When trapping an (externally applied) magnetic field with a superconductor bulk magnet, this trapping is generally imperfect. In other words, the trapped magnetic field differs from the externally applied magnetic field to some degree, in particular with respect to homogeneity. So even when the applied external magnetic field during field-cooling was perfectly homogeneous, the resulting trapped magnetic field may carry significant inhomogeneities. The reasons for this can be, for example, the geometry of the superconductor bulk magnet as such, temperature gradients across the superconductor bulk magnet (which in particular influence the local current carrying capacity), the presence of slightly magnetic components (including the bulk magnets themselves), or variations in material (originating for example from a growth process, also influencing the current carrying capacity). By purposefully introducing some inhomogeneity into the applied magnetic field, in accordance with the invention, it is possible to take into account the imperfect magnetic field trapping behaviour and compensate for it, and to arrive at a homogeneous magnetic field, in particular a more homogeneous field than the one applied.

In more detail, before the field-cooling process is started, the correlation between the applied magnetic field of the magnet charger system and a trapped magnetic field of the superconductor bulk magnet is determined in the sample volume. This correlation is basically a characteristic of the used charger arrangement, namely of the type and possibly also of the specimen of the magnet charger system, and of the type and possibly also of the specimen of the specific superconductor bulk magnet. The correlation is typically measured by preparatory measurements, but it is also possible to calculate the correlation for suitable setups. Knowing the correlation between the applied magnetic field of the magnet charger system and the trapped magnetic field of the superconductor bulk magnet in the sample volume, it is possible to determine and apply the (first) magnetic field needed to obtain a desired trapped homogeneous (second) magnetic field of the superconductor bulk magnet.

During a procedure according to the invention, the superconductor bulk magnet is exposed to the first magnetic field generated by the magnet charger system, i.e. by the background charger magnet and the field adjustment unit. The field adjustment unit is set (adjusted) so that the first magnetic field generated by the magnet charger system comprises a homogeneous field component and the at least one non-homogeneous magnetic field component. With this non-homogeneous first magnetic field used for charging the superconductor bulk magnet by field-cooling, it is possible to trap the second magnetic field in the superconductor bulk magnet that is more homogeneous than the first magnetic field. In particular this second magnetic field may show a higher homogeneity as compared to a resulting trapped magnetic field applying a highly homogeneous magnetic field to charge the superconducting bulk magnet.

The at least one (non-zero) non-homogeneous magnetic field component of the first magnetic field in the sample volume is deliberately introduced in order to compensate for the imperfect trapping of the magnetic field in the sample volume by the superconductor bulk magnet, and to result in a homogeneous trapped magnetic field. Imperfect trapping in particular can originate from a finite length of the superconductor bulk magnet, or temperature gradients in the superconductor bulk magnet. These two factors are often the most important sources of an imperfect trapping behaviour of a charger arrangement.

The trapping process introduces (or adds) a distortion to the first magnetic field applied by the magnet charger system, resulting in the second magnetic field in the sample volume to deviate from the first magnetic field. As mentioned above, by knowing the correlation between the first and second magnetic field for the given setup of magnetic charger system and bulk magnet, for obtaining a homogeneous second magnetic field, a first magnetic field can be applied comprising a homogeneous field component and an appropriate at least one non-homogeneous field component. The at least one non-homogeneous magnetic field component represents an "inverse" of the expected distortion by the trapping process, such that the deliberately applied "inverse" distortion and the distortion intrinsic to the trapping process cancel each other out, at least approximately.

As a result, from a non-homogeneous applied first magnetic field, a homogeneous second magnetic field can be obtained. In particular, a second magnetic field having a much higher homogeneity (e.g. at least factor 3 higher) as compared to an applied first magnetic field can be achieved, and also a second magnetic field having a much higher homogeneity (e.g. at least factor 3 higher) as compared to a second magnetic field resulting from a homogeneous first magnetic field can be achieved, with respect to identical sample volumes.

In accordance with the invention, this correlation is chosen with a linear function for each applied non-homogeneous magnetic field component comprised in the first magnetic field and to be adjusted by the field adjustment unit, wherein each linear function is defined by a slope and an offset, and correlates the component strength value of the magnetic field applied with the component strength value of the magnetic field trapped for its non-homogeneous magnetic field component, and wherein determining this correlation includes at least determining the offset for each linear function by calculation and/or by measurement. The inventors have found that choosing this correlation with a linear function for each applied non-homogeneous magnetic field component is sufficiently accurate and easy to handle. The offset of a linear function can be determined, for example, by identifying the crossing point of the linear function graph with the upward axis in a diagram plotting the component strength value of the magnetic field applied to the right axis (abscissa) and the component strength value of the magnetic field trapped to the upward axis (ordinate). If the slope is unknown, the function line of the linear function can be found if at least two measurement points are known. If the slope is known (at least approximately), one measurement point is sufficient to determine the crossing point. The slope of the linear function represents the efficiency of the charging from the magnetic field applied (or the first magnetic field) to the magnetic field trapped (or the second magnetic field). The offset represents the core information about the trapping behaviour.

In accordance with the invention, the first magnetic field is applied by the magnet charger system (only) from the radial outside of the superconductor bulk magnet.

Note that in general, a high homogeneity level (such as 100 ppm or better, or even 10 ppm or better) of the trapped magnetic field is only required and established in a small volume inside the sample volume. A typical sample volume, in accordance with the invention, includes at least a z interval from −2 mm to +2 mm, preferably at least −4 mm to +4 mm, and a radius about the z-axis of at least 1.5 mm, preferably at least 2.5 mm. The z axis runs along the bulk bore (and the charger bore). In general, only $B_z$ components of magnetic fields are considered here.

The superconductor bulk magnet is typically made from a high temperature superconductor, in particular of ReBCO type, or made of a $MgB_2$. Typically, $T_c \geq 30K$, such that the cryostat may be operated dry. A typical superconductor bulk magnet used in the invention is designed to conserve a magnetic field of a strength of between 3 Tesla and 10 Tesla, and often between 4.5 Tesla and 7.5 Tesla, and it has typically a benchtop size (including its cryostat).

In general, the superconductor bulk magnet is of a closed ring shape, made of a single superconductor ring structure or of a plurality of ring-shaped superconductor sub-structures such as discs or coatings on a substrate (such as a sheet metal or a foil); the ring-shaped sub-structures are arranged coaxially and stacked axially and/or radially, and may be combined into a so-called "composite bulk" by structurally connecting the sub-structures. All these variants constitute superconductor bulk magnets, in accordance with the invention. Structures or sub-structures for a superconductor bulk magnet may be grown from a melt; sub-structures to be combined into a "composite bulk" are typically made by coating a substrate. A superconductor bulk magnet, in accordance with the invention, allows a trapping of a magnetic field in its bore, wherein the superconductor bulk magnet in general does not possess any electric current supplies, but instead is designed for inductive charging only.

Preferred Variants According to the Invention

In a preferred variant of the inventive method, for a majority of applied non-homogeneous magnetic field components comprised in the first magnetic field and adjusted by the field adjustment unit, preferably for each applied non-homogeneous magnetic field component comprised in the first magnetic field and adjusted by the field adjustment unit, a corresponding applied component strength value of the first magnetic field is larger in absolute value than a corresponding trapped component strength value in the second magnetic field, in particular wherein said trapped component strength value in the second magnetic field is approximately zero. In this variant, for a majority (preferably each) of the applied non-homogeneous magnetic field components comprised in the first magnetic field and adjusted by the field adjustment unit, the respective contribution of the individual non-homogeneous magnetic field to the final second magnetic field is reduced. In this way, the homogeneity of the overall second (trapped) magnetic field can in general be increased. Note that in some application cases it can be beneficial to choose single component strength values of the applied non-homogeneous magnetic field components comprised in the first magnetic field and adjusted by the field adjustment unit such that they lead to higher respective trapped component strength values in the second magnetic field; this may improve the homogeneity of the second magnetic field when specific further non-homogeneous magnetic field components are present in the first magnetic field and/or generated in the second magnetic field that are not accessible by the field adjustment unit.

In a preferred variant, this at least one non-homogeneous magnetic field component of the first magnetic field is one or a plurality of gradient components of the first magnetic field, in particular with the gradient components being associated with first or higher order spherical harmonics. In other words, each non-homogeneous magnetic field component applied represents a particular gradient component, typically represented by a spherical harmonic function and its coefficient that is part of the spherical harmonic expansion of the gradients, of the first magnetic field. Typically, the field adjustment unit can directly adjust gradient components of the first magnetic field associated with spherical harmonics, and field calculations may be easier with standard software tools. The strength of the respective component is represented by a corresponding component strength value ("amplitude" or "coefficient" of the gradient). Note that the at least one non-homogeneous magnetic field component may comprise onaxis and/or off-axis gradient components. Typically, the invention compensates at least 1 (usually, $z^2$), preferably at least 2 (to include $z^1$), and often at least 3, different gradient components.

In a preferred further development of the above variant, the field adjustment unit comprises a plurality of field adjustment coils allowing a direct adjustment of one or a plurality of individual gradient components,
in particular wherein the field adjustment unit is chosen with a field adjustment coil or set of field adjustment coils for each gradient component. The use of this plurality of field adjustment coils (magnet coils) simplifies adjusting the different gradient components and thereby the first magnetic field.

In a preferred variant of the inventive method, for at least approximately determining this correlation, before the cycle of steps a), b) and c), at least one preparatory cycle of steps is applied, with each preparatory cycle comprising:
step a') the magnet charger system is charged, such that after this charging it generates a first provisional magnetic field in the sample volume, wherein a magnetic field profile of said first provisional magnetic field is measured or calculated, in particular from electric currents applied to the magnet charger system, wherein the superconductor bulk magnet has a temperature T, with $T>T_c$;
step b') the superconductor bulk magnet is cooled to a temperature $T<T_c$;
step c') the magnet charger system is discharged, what inductively charges the superconductor bulk magnet, such that the superconductor bulk magnet traps a second provisional magnetic field in the sample volume, wherein a magnetic field profile of said second provisional magnetic field is measured. In this approach, the correlation is determined experimentally. Detailed information about design parameters are not necessary and calculating the correlation from them is not required. Further, this correlation can be determined for the particular specimens in use, taking into account possible production tolerances that might affect the correlation for the particular specimens.

In a preferred further development of this variant, in the course of step a'), a respective applied component strength value for each of the at least one non-homogeneous magnetic field component to be adjusted by the field adjustment unit is determined from the measured or calculated magnetic field profile of the first provisional magnetic field, and that in the course of step c'), a respective trapped component strength value for each of the at least one non-homogeneous magnetic field component to be adjusted by the field adjustment unit is determined from the measured magnetic field profile of the second provisional magnetic field. In this way for each of the at least one non-homogeneous magnetic field component to be adjusted by the field adjustment unit a sub-correlation can determined in a simple way. The entirety of sub-correlations represents the correlation between the applied field and resulting trapped field of the setup. The respective sub-correlation is then used to specifically adjust the respective applied component strength value for each of the at least one non-homogeneous magnetic field component.

In another preferred further development, in a next cycle of steps a), b) c) or a next preparatory cycle of steps a'), b'), c'), in a respective next step a) or a'), the field adjustment unit is set such that a respective non-homogeneous magnetic field component of the first magnetic field to be adjusted by the field adjustment unit is chosen with a next applied component strength value being the applied component strength value of the previous step a') minus the trapped component strength value of the previous preparatory cycle of steps. With this, the respective non-homogeneous magnetic field component should approximately vanish (become zero) in the resulting second (provisional or final) magnetic field. In good approximation, a 1:1 correlation ("slope 1") of applied and trapped gradient components can be assumed. If the slope is less than one, than a corresponding factor has to be applied for determining the next applied component strength value.

Preferred is also a further development wherein in step c), a magnetic field profile of the second magnetic field is measured,
that in each step c') and step c), the homogeneity of the measured second provisional magnetic field or second magnetic field in the sample volume is compared to a predefined homogeneity threshold,
and when the homogeneity of the measured second provisional magnetic field is worse than the homogeneity threshold in a step c'), then another preparatory cycle of steps a'), b'), c') or a cycle of steps a), b) and c) follows,
and when the homogeneity of the measured second magnetic field is equal to or better than the homogeneity threshold in a step c), then the second magnetic field in the sample volume is kept, and the method ends. This procedure simplifies and facilitates safely reaching a desired homogeneity level. The comparison of the measurement of the second magnetic field with the predefined homogeneity threshold allows to evaluate if the homogeneity of the second magnetic field is as required for intended following applications. This predefined homogeneity threshold may be chosen depending on the intended application and its required homogeneity. If this predefined homogeneity threshold is not met, for whatever reason, another preparatory cycle of steps a'), b'), c') is initiated.

Also preferred is a variant wherein for at least approximately determining the correlation, before the cycle of steps a), b) and c), a magnetic field trapping behaviour of the magnet charger system and the superconductor bulk magnet is calculated in advance, in particular numerically simulated in advance, taking into account at least
the geometry of the magnet charger system or its magnetic field, and the geometry of the superconductor bulk magnet. In other words, the correlation is determined here based on the general design of the charger arrangement. When calculating the correlation (or the trapping behaviour) for a setup type (i.e. type of magnet charger system and superconductor bulk magnet) in advance, this knowledge can be used for an arbitrary number of specimens of this setup type. Further, measuring the correlation can in principle be done without. This approach is particularly useful if the correlation is dominated by design features of the setup type, and not by manufacturing tolerances of the particular specimen or other unknown and/or variable factors. Note that the accuracy of the calculation of the correlation or the magnetic field trapping behaviour of the magnet charger system and the superconductor bulk magnet depends on how precisely (in particular) the geometry of the magnet charger system (or its field) and the geometry of the superconductor bulk magnet are known. Further known factors like temperature gradients or particular material properties can be included into the calculation to increase the accuracy of the calculated correlation or trapping behaviour. Note that the correlation determined based on the general design of the charger arrangement can be used as an initial guess for the trapping behaviour, and is refined later on by measurement with the concrete charger arrangement (specimens of magnet charger system and superconductor bulk magnet).

In a preferred further development of this variant, this calculation of the magnetic field trapping behaviour includes, for each respective at least one non-homogeneous magnetic field component to be adjusted by the field adjustment unit, determining a target component strength value to be applied in the first magnetic field in order to obtain a desired, in particular zero, trapped component strength value in the second magnetic field,
and that in a following cycle of steps a), b), c) or a following preparatory cycle of steps a'), b), c'), the field adjustment unit is set such that the first magnetic field generated by the magnet charger system in the sample volume comprises the respective non-homogeneous magnetic field component with an applied component strength value corresponding to the determined target component strength value. In this way, after said following cycle of steps a), b), c) or following preparatory cycle of steps a'), b'), c'), the resulting second (final or provisional) magnetic field should have a high homogeneity. More generally speaking, this approach helps to quickly find a second (final) magnetic field of high homogeneity. After the target component strength value or values to be applied in the first magnetic field in order to obtain the desired trapped component strength value or values in the second magnetic field have been calculated, the field adjustment unit may be adjusted so that the correct non-homogeneous magnetic field component or components are included in the first magnetic field. If desired, it can be checked whether the desired trapped component strength value or values in the second (final or provisional) magnetic field have been obtained by a measurement.

In a preferred variant, for each linear function, the slope is chosen as 1 or between 0.95 and 1, or
the slope is determined by calculation and/or measurement, in particular wherein the slope is smaller than 1. If the field adjustment unit or its coils, respectively, are arranged sufficiently far from the superconductor bulk magnet, then the slope will (in good approximation) be 1, and the slope can be safely assumed to be 1 or approximately one (e.g. between 0.95 and 1), without calculation or measurement. The latter is particularly simple. If the field adjustment unit or its coils, respectively, are arranged closer to the superconductor bulk magnet, then the slope should be calculated or measured for better accuracy of the correlation.

Further preferred is a variant providing that the field adjustment unit comprises a plurality of field adjustment coils, with these field adjustment coils having
a maximum axial extension $L_{adjust}$ which is larger than a maximum axial extension $L_{bulk}$ of the superconductor bulk magnet, preferably with $L_{adjust} > 2*L_{bulk}$, and further
a maximum radial extension $R_{adjust}$ which is larger than 1.5 times the maximum radial extension $R_{bulk}$ of the superconductor bulk magnet, preferably with $R_{adjust} > 2*R_{bulk}$. With these dimensions, linear functions of the correlation can be assumed to have a slope of 1 in good approximation In a preferred variant of the inventive method, the magnet charger system is chosen with a superconducting background charger magnet, arranged in a charger cryostat. In this way it is possible to generate a first magnetic field of particularly high strength to charge the superconducting bulk magnet. The cryostat is needed to achieve and maintain a cryogenic temperature of the background charger magnet, and in particular to achieve and maintain its superconducting state.

In a preferred further development of this variant, the field adjustment unit is chosen with superconducting field adjustment coils, arranged inside the charger cryostat,
in particular wherein the field adjustment coils are arranged radially outside the superconducting background charger magnet. The superconducting field adjustment coils can carry high currents that are needed to create and adjust a high (first) magnetic field. When placing the adjustment coils inside the charger cryostat, only one cryostat is needed for the entire magnet charger system. A position of the field adjustment coils radially outside the superconducting background magnet is advantageous in that more space in the charger bore is available for the superconductor bulk magnet.

Also preferred is a variant wherein the superconductor bulk magnet is attached to a cooling stage contacting the superconductor bulk magnet at one axial end,
and that the at least one non-homogeneous magnetic field component comprises a gradient component associated with the z spherical harmonic of the first magnetic field adjusted by the field adjustment unit. Attaching the superconductor bulk magnet at one axial end to a cooling stage is easy and cost-effective to implement. However, such a one-sided cooling stage typically generates a temperature gradient inside the superconductor bulk magnet, affecting the current carrying capacity. This would lead to an inhomogeneous trapped magnetic field if the applied field was chosen to be homogeneous without any further adjustments by for example the field adjustment unit. By adjusting the contribution of the z spherical harmonic ("Z gradient component") the inhomogeneity in the trapped magnetic field can be corrected or avoided, respectively.

In an advantageous variant, the superconductor bulk magnet is chosen with a cylinder jacket shape having a constant wall thickness,
and that the at least one non-homogeneous magnetic field component comprises a gradient component associated with the $z^2$ spherical harmonic component of the first magnetic field adjusted by the field adjustment unit.

Manufacturing and implementing the superconductor bulk magnet with a cylinder jacket shape having a constant wall thickness is easy to do. However, this cylinder jacket shape generates an inhomogeneous trapped magnetic field if the applied field was chosen to be homogeneous without any further adjustments by for example the field adjustment units. By adjusting the contribution of the $z^2$ spherical harmonic ("$Z^2$ gradient component") the inhomogeneity in the trapped magnetic field can be corrected or avoided, respectively.

Further advantages can be extracted from the description and the enclosed drawing. The features mentioned above and below can be used in accordance with the invention either individually or collectively in any combination. The embodiments mentioned are not to be understood as exhaustive enumeration but rather have exemplary character for the description of the invention.

DETAILED DESCRIPTION

Figure 1:
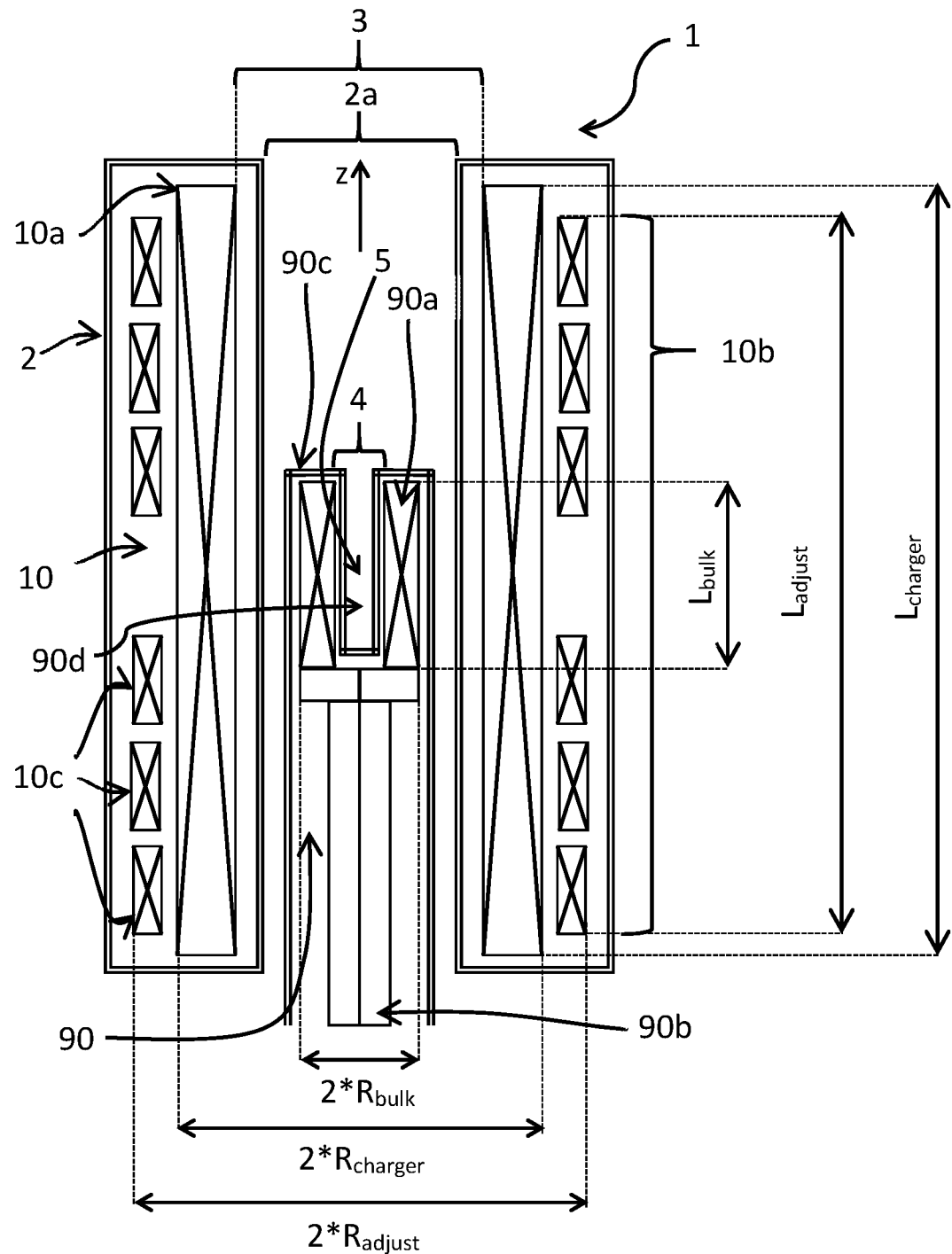
FIG. 1 shows a schematic cross-sectional view of an arrangement for charging a superconducting bulk magnet in accordance with the invention.

FIG. 1 shows schematically an exemplary arrangement 1 for magnetizing (charging) a superconductor bulk magnet 90a by field-cooling, for use in an example of the inventive method.

The charging arrangement 1 comprises a magnet charger system 10 that comprises a background charger magnet 10a and a field adjustment unit 10b. The field adjustment unit 10b includes a plurality of field adjustment coils 10c. The background charger magnet 10a is chosen here as a superconducting background magnet and arranged inside a charger cryostat 2. In general, the background charger magnet 10a generates a basically homogeneous magnetic field component for a first magnetic field. The background charger magnet 10a is basically of cylindrical shape, here with a single solenoid type coil operated with a single electrical current (alternatively the background charger magnet 10a may comprise e.g. a plurality of radially stacked coaxial coils, operated with individual electrical currents). The background charger magnet 10a has a charger bore 3 inside of which the largest magnetic field strength of the first magnetic field may be achieved.

The field adjustment unit 10b with its field adjustment coils 10c is arranged radially outside of the background charger magnet 10a in the example shown. Alternatively, the field adjustment unit 10b may be arranged radially inside of the charger magnet 10a (but outside of the bulk magnet bore 4) (not shown). In such a variant, however, there is less space available in the charger bore 3. The field adjustment coils 10c are chosen here as superconducting field adjustment coils and located in the charger cryostat 2 of the magnet charger system 10. The field adjustment unit 10b generally basically generates at least one non-homogeneous magnetic field component of the first magnetic field. The field adjustment coils 10c are chosen such that a plurality of individual gradient components may be set directly, in particular a $z^1$ and a $z^2$ gradient component (sometimes also referred to H1 and H2).

Inside the charger bore 3 of the background charger magnet 10a, and inside the room temperature bore 2a of the charger cryostat 2, a magnetic field generator 90 with a superconductor bulk magnet 90a is arranged. In the example shown, the superconductor bulk magnet 90a is of basically cylinder jacket shape of constant wall thickness. The superconductor bulk magnet 90a allows circular currents to run through it. In a preferred variant, the superconductor bulk magnet 90a is made of a high temperature superconductor material; in a particularly preferred variant, the superconductor bulk magnet 90a is made of a ReBCO type superconductor material. The superconductor bulk magnet 90a has a bulk magnet bore 4, and the bulk magnet bore 4 contains a sample volume 5 at its center. The sample volume 5 may be accessed from at least one side. In the example chosen, the sample volume can be accessed from the top; in other embodiments, the bulk magnet bore 4 may have two sides open (not shown). The superconductor bulk magnet 90a is arranged in a cryostat 90c, which is independent of the charger cryostat 2 of the magnet charger system 10, and the sample volume 5 is arranged in a room temperature bore 90d of the cryostat 90c. It is also possible to add radiation shields (not shown) to reduce the heat input to the superconductor bulk magnet 90a. In the example shown, the superconductor bulk magnet 90a is attached at its lower end to a cooling stage 90b inside the cryostat 90c; note that alternatively it is possible to use two or more cooling stages to prevent the formation of a temperature gradient inside the superconductor bulk magnet 90a (not shown). The cooling stage 90b is preferentially cooled with a cryocooler, such as a pulse tube cooler (not shown); alternatively it may be cooled with cryogenic fluids (not shown).

The background charger magnet 10a has in axial direction (z direction) a length $L_{charger}$ that is larger than the length $L_{bulk}$ of the superconductor bulk magnet 90a (e. g. $L_{charger} > L_{bulk}$, preferably $L_{charger} > 2*L_{bulk}$). The correction coils 10c that make up the field adjustment unit 10b have a combined length $L_{adjust}$ that is larger than the length $L_{bulk}$ of the superconductor bulk magnet 90a (e. g. $L_{adjust} > L_{bulk}$, preferably $L_{adjust} > 2*L_{bulk}$). Furthermore, the correction coils 10c have a (maximum) radius $R_{adjust}$ that is larger than the (maximum) radius $R_{charger}$ of the background charger magnet 10a (e. g. $R_{adjust} > R_{charger}$). The correction coils 10c also have a (maximum) radius $R_{adjust}$ that is more than 1.5 times larger than the (maximum) radius $R_{bulk}$ of the superconductor bulk magnet 90a (e. g. $R_{adjust} > 1.5*R_{bulk}$, preferably $R_{adjust}>2*R_{Bulk}$). These dimensions ensure that the inventive method may be performed in a simpler way (compare description of FIG. 4).

Figure 2:
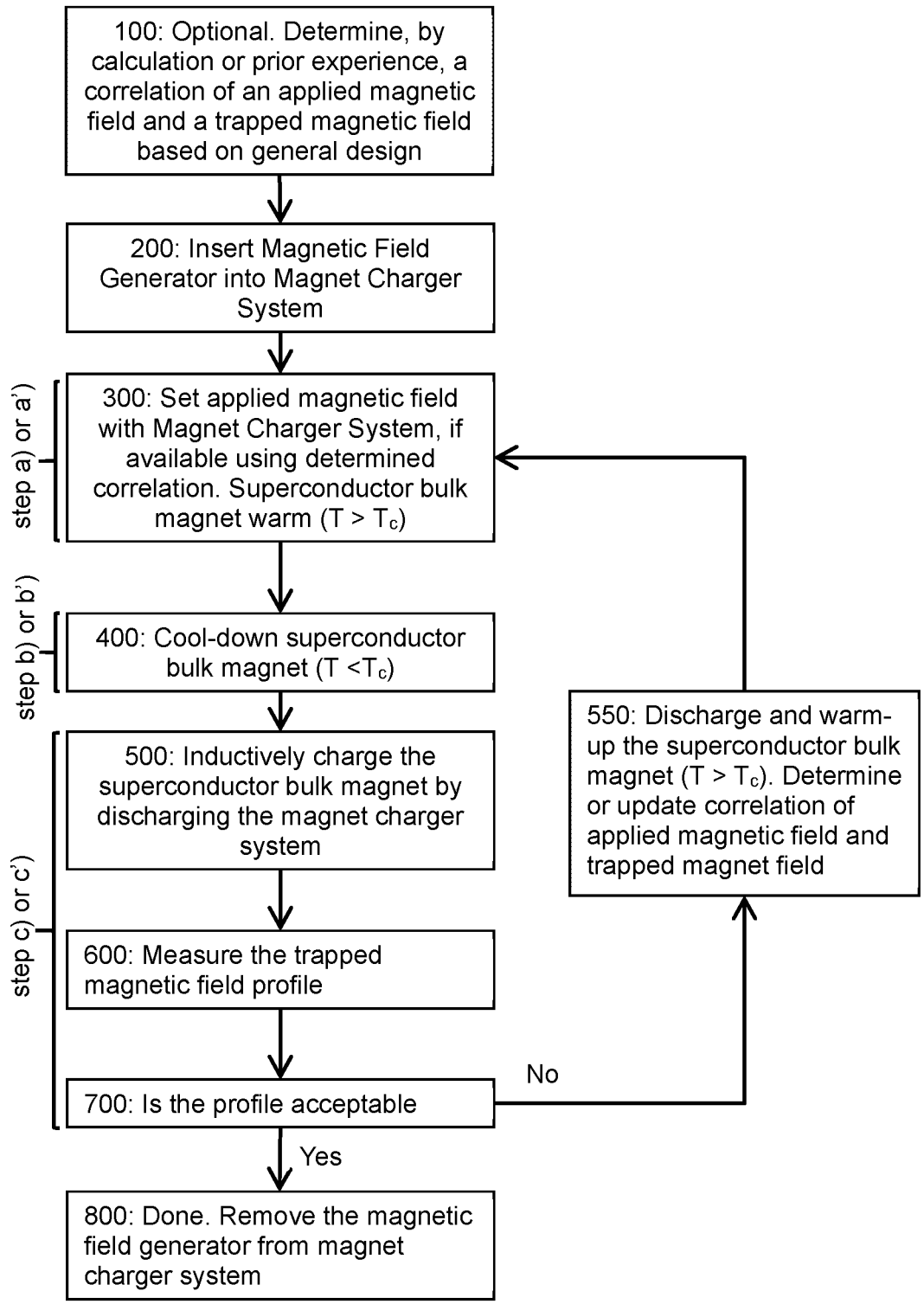
FIG. 2 shows a schematic flow diagram of an exemplary variant of the inventive method for charging a superconductor bulk magnet.

FIG. 2 illustrates an inventive method for magnetizing (charging) a superconductor bulk magnet in an exemplary variant. The method may be performed with an arrangement as shown in FIG. 1, for example.

In a first step 100 a correlation between a desired trapped magnetic field in the superconductor bulk magnet and an applied field to achieve the desired trapped magnetic field is determined for the arrangement based on its general design. This correlation may be calculated from the design of the arrangement used, knowing in particular the geometry of the magnet charger system and the geometry of the superconductor bulk magnet. The correlation may also be known by prior experience with similar field trapping setups, i. e. from other specimen of charger magnet system and superconductor bulk magnet of the same type. Note that step 100 is optional; if the correlation is not known or determined in advance, it is also possible to determine a correlation via a preparatory cycle which will be described later.

In the variant shown, in a step 200 the magnetic field generator (comprising the superconductor bulk magnet) is placed in the magnet charger system (comprising the charger magnet and the field adjustment unit) inside the bulk magnet bore. Note that in general, the magnet charger system is stationary, and for example located at the premises of the manufacturer of the superconductor bulk magnet. Further note that in general, the superconductor bulk magnet is held inside a cryostat the inner temperature of which may be controlled.

Then in a next step 300, the magnet charger system is charged, generating an applied magnetic field on the superconductor bulk magnet, and in particular a first magnetic field in the sample volume.

If a correlation has been determined in a step 100 or a step 550 (see below) before, the first magnetic field comprises a homogeneous magnetic field component and at least one non-homogeneous magnetic field component ("gradient component"), wherein the latter is/are chosen in accordance with the correlation such that the (imperfect) trapping behavior of the arrangement will lead to an optimal (highly homogeneous) trapped second magnetic field in the sample volume after step 500 (see below).

If a correlation has not been determined yet, the first magnetic field may be chosen provisionally in an arbitrary way; in general then a homogeneous provisional first magnetic field is preferably chosen.

The charger magnet generates in general predominantly the homogeneous magnetic field component, and the field adjustment unit generates in general above all the at least one non-homogeneous magnetic field component. The magnetic field components are superposed to add up to the first magnetic field. A magnetic field profile of the first (provisional or final) magnetic field is measured or calculated (the calculation is for example based on the electric currents applied to the magnet charger system). The generation of the magnetic fields is achieved by ramping up the electrical currents of the magnet charger system. During the generation of the first magnetic field the temperature T of the superconductor bulk magnet is larger than its critical temperature $T_c$, so the superconductor bulk magnet is normally conducting during step 300. As a consequence, the magnetic field generated by the charger magnet system penetrates the superconductor bulk magnet basically unhindered and fills the bulk magnet bore.

In a next step 400, the superconductor bulk magnet is made superconducting by lowering the temperature inside the cryostat, such that T becomes lower than $T_c$ (i. e. $T<T_c$). Note that T should be chosen significantly below $T_c$ such that enough current carrying capacity for next step 500 is ensured.

Then in step 500, the magnetic field of the magnet charger system is turned off. To achieve this the electrical currents operating the charger magnet system are ramped down. The superconductor bulk magnet conserves the magnetic flux in its bulk magnet bore, resulting in a trapped magnetic field. More specifically, a second magnetic field is trapped in the sample volume. To remain superconducting the superconductor bulk magnet is kept with $T<T_c$. Note that the second magnetic field in general differs somewhat from the first magnetic field, indicating the imperfect trapping behavior of the arrangement.

In a preferred optional sub-step the superconductor bulk magnet 90a may be further cooled down to an operation temperature $T_{op}$. $T_{op}$ is smaller than the temperature to trap the magnetic field $T_t$ (e. g $T_{op}<T_t$, preferably $T_{op}<(T_t-2.5$ K). This additional reduction in temperature of the superconductor bulk magnet reduces drift. In other variants it is also possible to perform this sub-step during or after step 600 or after step 700.

Now in step 600, the magnetic field profile of the second magnetic field is measured within the bulk magnet bore.

Next in step 700, the homogeneity of the measured second magnetic field profile is then compared to a predefined homogeneity threshold. There are two possible choices in step 700:

When the homogeneity of the second magnetic field is equal to or better than the homogeneity threshold, the (then final) second magnetic field in the sample volume of the bulk magnet bore is accepted and kept. Previous steps 300, 400, 500 then constitute the final cycle of (field-cooling) steps. The method continues with step 800, where the magnetic field generator is removed from the magnet charger system and the method ends.

When the homogeneity of the second magnetic field is worse than the homogeneity threshold, the (then provisional) second magnetic field in the sample volume of the bulk magnet bore is rejected. The method continues with step 550, where the superconductor bulk magnet is warmed-up above $T_c$ and in this way discharged so that it can be charged again. If no correlation of applied magnetic field and trapped magnetic field has been determined up to now, the correlation is now determined based on the applied (provisional) first magnetic field of step 300 and the measured (provisional) second magnetic field of step 600. If a correlation has been determined before, it can now be updated or refined using the (then provisional) first magnetic field of step 300 and the measured (provisional) second magnetic field of step 600. Previous steps 300, 400, 500 then constitute a preparatory cycle of (field-cooling) steps, and the method continues at step 300.

When after step 550 another cycle of steps is started at step 300, the information obtained from the determination of the magnetic field profile of the first provisional magnetic field and the magnetic field profile of the second provisional magnetic field can be used to set the field adjustment unit such that for a respective non-homogeneous magnetic field component the trapped component strength value of the previous preparatory cycle is subtracted from the applied component strength value of the previous preparatory cycle, resulting in the component strength value to be applied in the following cycle of steps.

Figure 3:
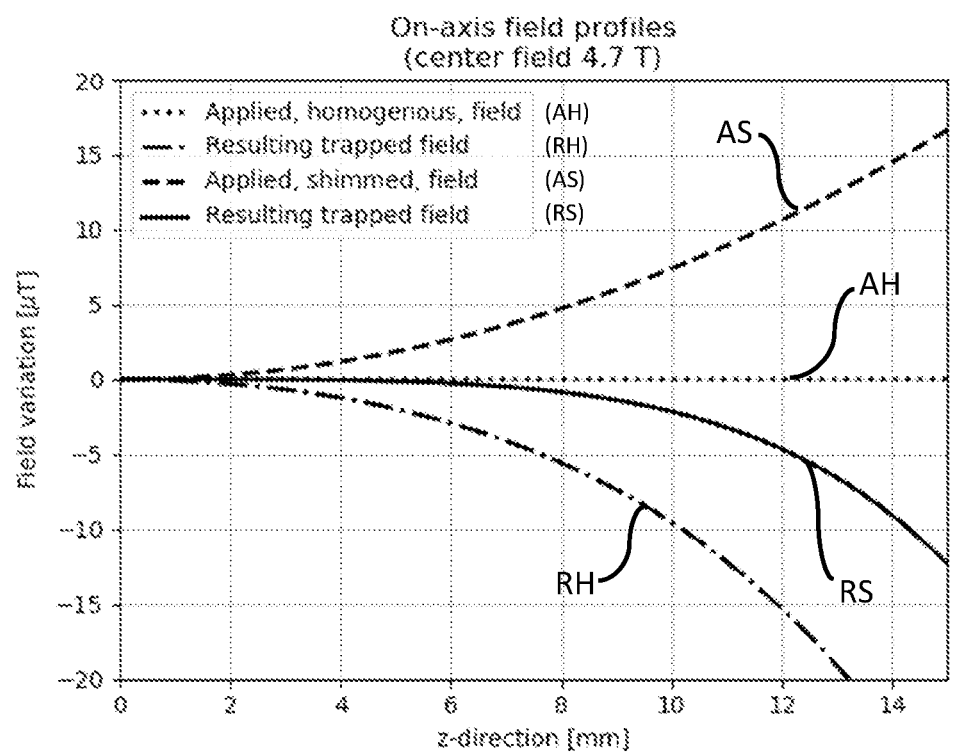
FIG. 3 shows a schematic diagram indicating an applied conventional homogeneous magnetic field and an applied non-homogeneous magnetic field in accordance with the invention and the respective resulting trapped magnetic field in the superconducting bulk magnet.

FIG. 3 illustrates in a schematic diagram an applied conventional homogeneous magnetic field and an applied non-homogeneous magnetic field in accordance with the invention, and respective resulting trapped magnetic fields of the superconducting bulk magnet after field-cooling. In this example $z^2$ shimming was done in accordance with the invention. The superconductor bulk magnet was built according to Design A of FIG. 5. FIG. 3 depicts on-axis field profiles with a center field of 4.7 T. The abscissa shows the z-direction in mm and the ordinate shows the field variation in µT. First the case of an applied homogeneous magnetic field is discussed (dotted line AH in FIG. 3), then the case of an applied non-homogeneous magnetic field is shown (dashed line AS in FIG. 3).

Applied Homogeneous Magnetic Field

In a first attempt, an applied magnetic field that is as homogeneous as possible is generated (see curve AH). In this example the on-axis field profile of the applied homogeneous magnetic field in the bulk magnet bore does not show any field variation within the shown area. The charging process by field-cooling corresponds to steps 300, 400 and 500 in FIG. 2. The superconductor bulk magnet is charged with the applied homogeneous magnetic field but the resulting trapped magnetic field (curve RH) exhibits a lower homogeneity than the applied magnetic field. The trapped magnetic field in this example already starts to vary at about 2 mm and decreases non-linearly for larger z (dotdashed line RH in FIG. 3).

This insufficient trapping of the applied magnetic field may be caused by the geometry of the superconductor bulk magnet, in particular its finite length or a non-optimal notch design due to space constraints, temperature gradients in the superconductor bulk magnet, the presence of (even slightly) magnetic components in the arrangement and production tolerances of the different components. So as shown for the example design, an applied magnetic field that is as homogeneous as possible does not lead to a homogeneous trapped field.

Applied Non-Homogeneous Magnetic Field

With the knowledge about the trapped magnetic field of the former case it is now possible to set the field adjustment unit such that the first magnetic field generated by the magnet charger system comprises at least one non-homogeneous magnetic field component next to the homogeneous magnetic field component. The at least one non-homogeneous magnetic field component is chosen as the inverse value of the trapped magnetic field component of the first attempt. In the illustrated example of FIG. 3, the $z^2$ gradient component strength value was determined for the curve RH. Then a shimmed field AS was applied, having the opposite $z^2$ gradient component strength value. The charging process by field-cooling corresponds to steps 300, 400, 500 in FIG. 2. The superconductor bulk magnet is charged with the applied non-homogeneous magnetic field. As a result, the trapped magnetic field in this example is highly homogeneous and does not start to vary until about 6 mm (solid line RS in FIG. 3). When comparing the resulting trapped magnetic fields (dashdotted line RH and solid line RS in FIG. 3) one can see that the homogeneity of the trapped field is higher when the applied magnetic field has been chosen non-homogeneous in accordance with the invention.

Figure 4:
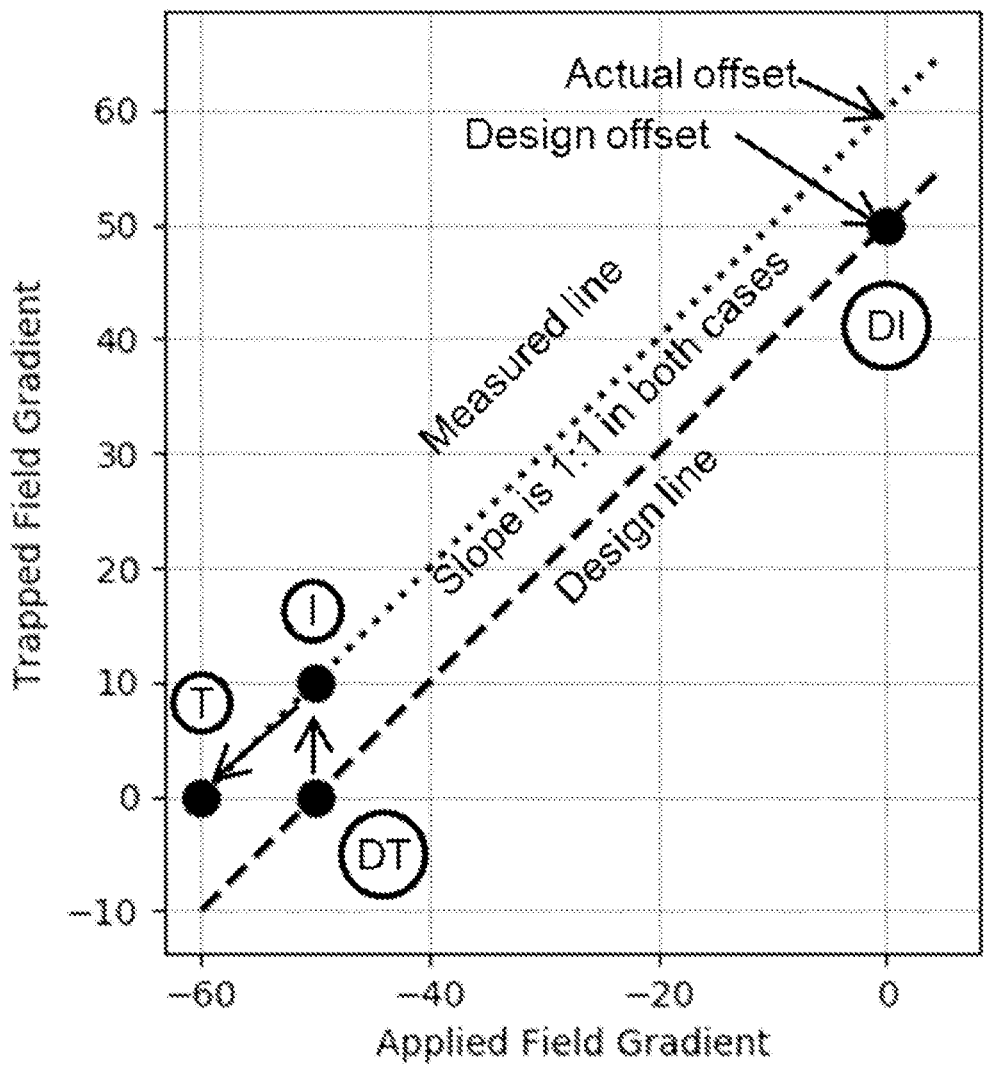
FIG. 4 shows a schematic diagram that explains how to determine a gradient component strength value of a non-homogeneous magnetic field component comprised in the first magnetic field.

FIG. 4 shows a schematic diagram that explains how to determine the applied non-homogeneous magnetic field components or their respective component strength values comprised in the first magnetic field. The at least one non-homogeneous magnetic field component corresponds to one or a plurality of gradient components in the first magnetic field. They may be described as spherical harmonics of first or higher order or their coefficients, respectively.

First of all, for a perfect charging arrangement there would be no offset between the applied (first) and the trapped (second) magnetic field. In other words the superconductor bulk magnet would exactly trap the applied magnetic field of the magnet charger system. However, reality is different in that an offset between a trapped field gradient and an applied field gradient may be found. There are two offset components, namely:

a design offset, caused by the charging arrangement as designed, originating for example from the presence of real materials (paramagnetism of superconductor bulk magnet, magnetic components, temperature gradients etc.) and finite sizes of the components; it can in principle be calculated a priori and is the same for a given design (type) and given operating conditions;
 a non-design offset, caused by differences of the actual charging arrangement as compared to the charging arrangement as designed, originating for example from manufacturing tolerances of the components, variation in material properties etc.

The design offset and the non-design offset result in an actual offset of a charging arrangement, which can be determined experimentally (i. e. measured). In practice, there is also scatter in the data that is caused by measurement errors and slight variations in the measurement procedure (e. g. time of measurement, slight differences in the cooling process, settling-in of the superconductor bulk magnet etc.).

There is a correlation between the first magnetic field and the second magnetic field. Furthermore, this correlation may be described with a linear function for each gradient component which is defined by a slope and an offset. In many setups, in particular when using a set-up as it has been described in FIG. 1, the slope of the linear function may be chosen as 1 or approximately 1. Then it is possible to determine the needed gradient components with only one measurement point. In divergent cases the slope may be determined by calculation and/or measurement. This is especially the case when the slope may be significantly smaller than 1. In this case at least two measurement points are needed instead of one.

FIG. 4 illustrates by way of example a design offset of a trapped field gradient and an actual offset of a trapped field gradient. Shown is an applied field gradient in arbitrary units on the abscissa, and the correspond resulting trapped field gradient in arbitrary units on the ordinate. An approach to determine the field gradient that has to be applied to get a desired trapped field gradient of close to zero may look like the following.

Based on the general design of a charger arrangement (type of magnet charger system, type of superconductor bulk magnet), a correlation between the applied and trapped magnetic field may be determined (calculated). The trapped field resulting from a zero applied field gradient according to the correlation based on the general design is called the design offset, and the related location in the diagram is called the initial design Point DI. The correlation based on the general design also includes a slope, indicating how efficient an applied field gradient value is transformed in a trapped field gradient value. In the example, this slope is 1 in good approximation, what can in many cases be assumed without calculation. A design line with this slope is laid through the initial design point DI. The design line intersects the abscissa and the so determined point is called the target design point DT. This target design point DT may be a convenient starting point for an actual field trapping attempt and can be used to set up the field adjustment unit for a charging cycle to achieve a second magnetic field with an ideally zero trapped component strength value. In the example shown, the design offset is at about +50 a. u., and the target design point is at about −50 a. u. of applied field gradient.

As described earlier the actual offset of the trapped field gradient might differ from the design offset due to for example manufacturing tolerances or process variations. To determine the actual offset a preparatory cycle of steps is for example performed to obtain the measured magnetic field profile of the second provisional magnetic field for a known magnetic field profile of the first magnetic field (see FIG. 2). Then the applied field gradient strength value and the trapped field gradient strength value are determined from these magnetic field profiles, and are denoted in the diagram as initial measurement (or initial measurement point) I. For this initial measurement I a measured line may be constructed, which intersects initial measurement point I and can be assumed to have slope 1 again (Note that if the actual slope is uncertain, at least two measurement points should be obtained, and the measured line can be obtained by linear fit). The point where the measured line intersects the ordinate shows the actual offset of the trapped field gradient, here at about +60 a. u. Furthermore, the measured line intersects the abscissa and the so determined point is called the final target T. This final target T should give the correct component strength value to be applied in the first magnetic field to obtain a trapped magnetic field without an offset of the trapped magnetic field components, which is here at about −60 a. u. of applied field gradient.

Note that the slope of the linear function represents the efficiency of the charging process. Herewith, the slope of the linear function may never be larger than 1, since this would mean that the efficiency of the charging process was above 100%, which is physically impossible.

Figure 5:
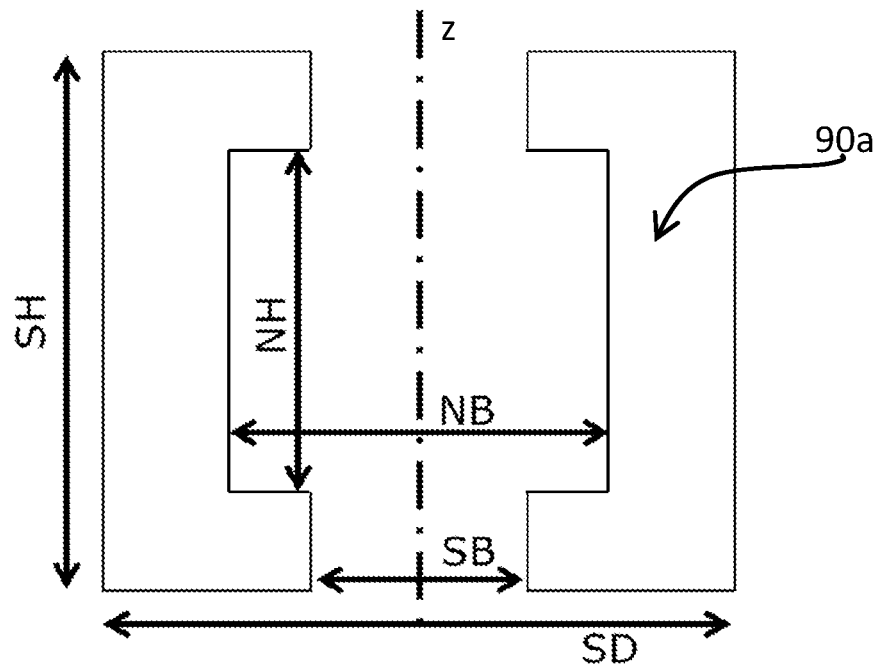
FIG. 5 shows a schematic cross-section of different possible designs for a superconductor bulk magnet for the invention.

FIG. 5 shows a schematic cross-section of a possible design for superconductor bulk magnet that can be used with the invention. The superconductor bulk magnet 90a may be described via a stack diameter SD, a stack height SH, a stack bore (diameter) SB, a notch height NH and a notch bore (diameter) NB. Two different designs are described.

Design A (also depicted in FIG. 5 top) has a SD of 60 mm, a SH of 140 mm, a SB of 33 mm, a NH of 100 mm and a NB of 40 mm. In this case the superconductor bulk magnet 90a comprises a notch. Notches may be used to increase the homogeneity of the trapped magnetic field. Note however, that it is not always possible to use an optimized notch design due to space constraints within the superconductor bulk magnet 90a.

Design B (not shown) has a SD of 60 mm, a SB of 40 mm and no notch, in other words the superconductor bulk magnet 90a has a constant wall thickness then. Sometimes it is not possible or not desired to implement notches due to for example space limitations within the experimental setup or to simplify the construction.

Figure 6:
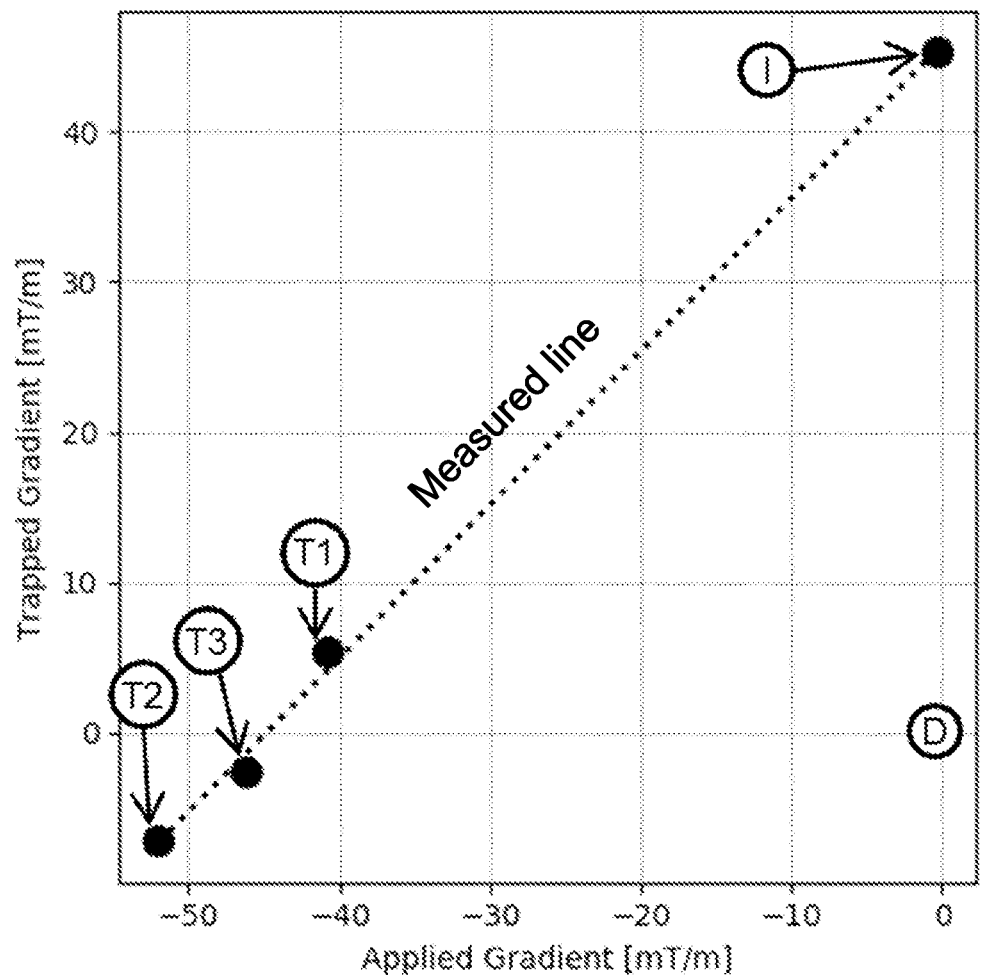
FIG. 6 illustrates in a schematic diagram the example of $z^1$ shimming for design B of FIG. 5.

FIG. 6 illustrates in a schematic diagram an experiment of $z^1$ shimming on design B of FIG. 5. The superconductor bulk magnet in this case has no notch. The abscissa shows the applied ($z^1$) gradient in mT/m, and the ordinate shows the resulting trapped gradient in mT/m.

In a first simplified model where the temperature of the superconductor bulk magnet is assumed to be uniform, there should be no significant offset of the trapped ($z^1$) gradient. The simplified design point D at the origin of the diagram depicts this case.

However in reality, when cooling of the superconductor bulk magnet is done from one axial end only, the cooling process of the superconductor bulk magnet results in an axial temperature gradient over the bulk magnet, what in turn affects the trapping behavior. An initial measurement I (here taken at zero applied gradient) shows that there is an (actual) offset of the trapped gradient, here of about +45 mT/m. The correlation between the applied and the trapped gradient contained in the initial measurement I may than be used. The correlation, or more specifically the sub-correlation with respect to the $z^1$ gradient component, is assumed as a linear function with slope 1 (as described in FIG. 4). Using the crossing point of the measured line (having slope 1 and containing the initial measurement point I) with the abscissa, it is possible to find the corresponding gradient component which has to be applied to reach a zero trapped gradient, here with about −45 mT/m. In this example several different gradient component strength values were applied to improve the homogeneity and to assess the linearity of the correlation and to confirm the value 1 of the slope, and to assess the reproducibility of the measurement (points T1, T2, T3). All points T1, T2 T3 are close to the measured line, indicating that the assumption of the slope value was justified and the reproducibility is high, and showing that a high homogeneity of the trapped field can be achieved.

The $z^1$ shimming may be used when the superconductor bulk magnet is attached to a cooling stage and has contact to the cooling stage on one axial end only. In this case the at least one non-homogeneous magnetic field component should comprise a gradient component which is associated with the z spherical harmonic of the first magnetic field that is adjusted by the field adjustment unit.

Figure 7:
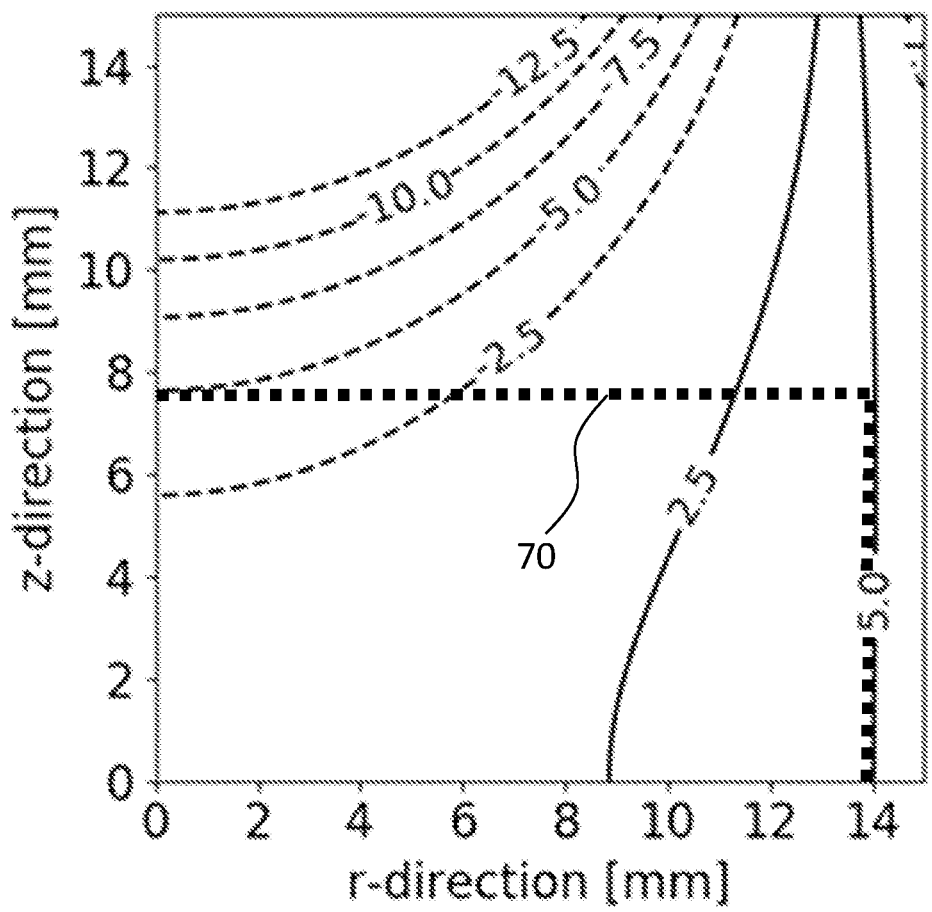
FIG. 7 shows a trapped field map in case the applied magnetic field was homogeneous for design A of FIG. 5.
Figure 8:
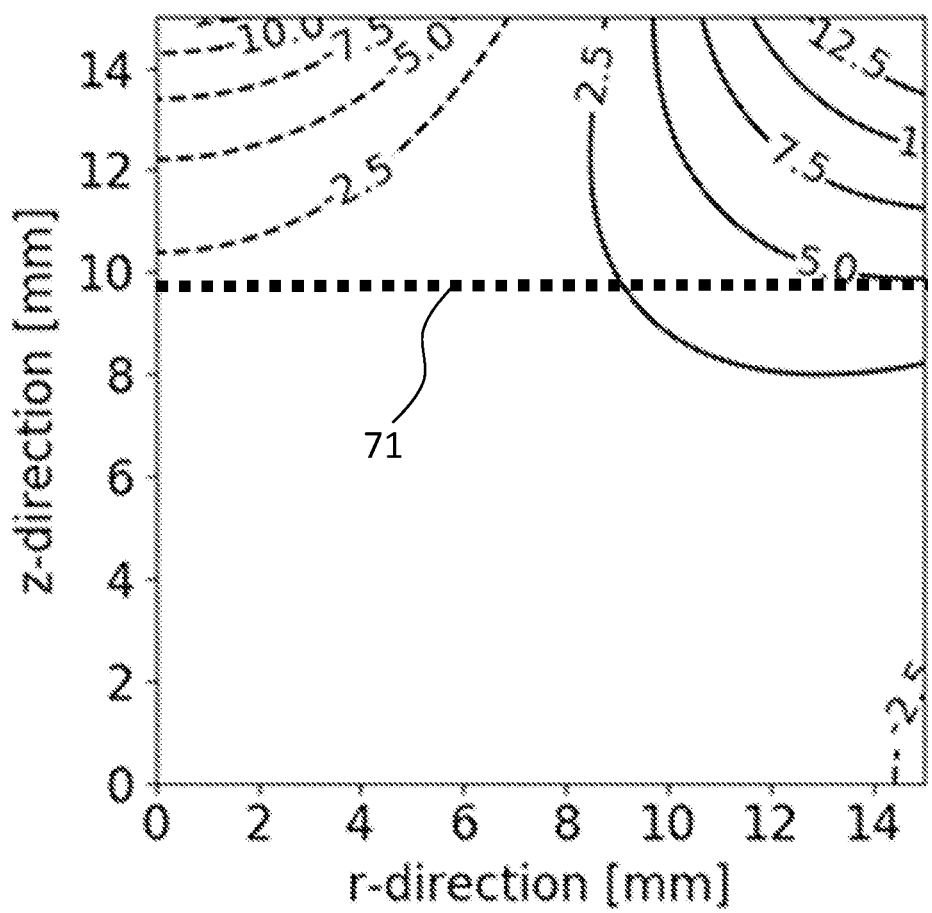
FIG. 8 shows a trapped field map in case the applied magnetic field was non-homogeneous in accordance with the invention, for design A of FIG. 5.

FIG. 7 and FIG. 8 show trapped field maps of an experiment of $z^2$ shimming on design A of FIG. 5. The superconductor bulk magnet has a notch, but due to space constraints within the superconductor bulk magnet an optimized notch design was not possible.

In FIG. 7 the applied magnetic field was homogeneous. In this case the 10 ppm cylindrical sample volume 70 (e. g. the sample volume with a desired high homogeneity level of the trapped magnetic field) has a diameter of 28 mm and a height of 15.4 mm (see black dotted line).

To improve the 10 ppm cylindrical sample volume 70 in this example and to overcome the problems of the not optimized notch design, a non-homogeneous magnetic field was applied as described earlier with an $z^2$ gradient component of about 75 mT/m$^2$ (also compare FIG. 3). As it can be seen in FIG. 8, in this case the 10 ppm cylindrical sample volume 71 is much larger and has a diameter of 35 mm and a height of 19.8 mm (see black dotted line).

The $z^2$ shimming may be used when the superconductor bulk magnet has a cylinder jacket shape with a constant wall thickness (as it is the case for Design B in FIG. 5) or with a notch only incompletely shaping the trapping behavior (as it is the case for Design A of FIG. 5). In these cases the at least one non-homogeneous magnetic field component should comprise a gradient component which is associated with the $z^2$ spherical harmonic of the first magnetic field that is adjusted by the field adjustment unit.

LIST OF REFERENCE SIGNS 1 (charger) arrangement
2 charger cryostat 2a room temperature bore (charger cryostat)
3 charger bore
4 bulk magnet bore
5 sample volume
10 magnet charger system
10a background charger magnet
10b field adjustment unit
10c field adjustment coils
70 10 ppm cylindrical sample volume
71 10 ppm cylindrical sample volume
90 magnetic field generator
90a superconductor bulk magnet
90b cooling stage
90c (bulk) cryostat
90d room temperature bore (bulk cryostat)
100 Determination of correlation (based on general design)
200 Setting up of the magnetic field generator
300 Generation of the first (provisional or final) magnetic field
400 Cooling down to $T_c$
500 Inductive charging of the superconductor bulk magnet
550 Discharging and warming up of the superconductor bulk magnet and determination of correlation (by experiment)
600 Measurement of the second (provisional or final) magnetic field
700 Comparison with homogeneity threshold
800 Removing of the magnetic field generator
AH Applied homogeneous field
AS Applied shimmed field
DI Initial design point
DT Target design point
I Initial point
$L_{adjust}$ Length field adjustment coils
$L_{bulk}$ Length superconductor bulk magnet
$L_{charger}$ Length background charger magnet
NB Notch bore (diameter)
NH Notch height
$R_{adjust}$ Radius field adjustment coils
$R_{bulk}$ Radius superconductor bulk magnet
$R_{charger}$ Radius background charger magnet
SB Stack bore (diameter)
SD Stack diameter
SH Stack height
RH Resulting trapped field
RS Resulting trapped field
T Target point
T1, T2, T3 Target points

REFERENCES

1. WO 2015/015892 A1
2. U.S. Pat. No. 7,859,374 B2
3. JP 2009 156 719 A
4. EP 3 492 941 A1
5. post published EP application 20 174 683.1
6. EP 3 657 193 A1
7. EP 3 726 544 A1
8. Deng et al. (2011). "Trapped Field Recovery of Bulk Superconductor Magnets by Static Field Magnetization" Physica C: Superconductivity and Its Applications, 471 (21-22), 1459-1463
9. Fujishiro et al. (2015). "Drastic Improvement of the Trapped Field Homogeneity in a Superconducting Hollow Bulk by the Insertion of a High-Jo Superconducting Cylinder for NMR Bulk Magnets" Superconductor Science and Technology, 28(9), 095018
10. Fujishiro et al. (2017). "Numerical Simulation of Trapped Field Homogeneity in an NMR Superconducting Bulk Magnet after Inserting a High-Jo HTS Thin Cylinder" TEION KOGAKU (Journal of Cryogenics and Superconductivity Society of Japan), 52(1), 33-37
11. Kim et al. (2014). "Study on the Remagnetization Process to Improve the Field Homogeneity of the Stacked HTS Bulk Magnets" IEEE TRANSACTIONS ON APPLIED SUPERCONDUCTIVITY, 24(3), 1-5
12. Kim et al. (2009). "Characteristics of the Magnetic Field Distribution on Compact NMR Magnets Using Cryocooled HTS Bulks" Physica C: Superconductivity and Its Applications, 469 (15-20), 1811-1815
13. Kitamura et al. (2014). "The Study to Improve the Field Homogeneity of the HTS Bulk Magnets for NMR Relaxometry Device by Passive Compensation Methods" Physics Procedia, 58, 298-301
14. Nakamura et al. (2015). "Development of a Superconducting Bulk Magnet for NMR and MRI" Journal of Magnetic Resonance, 259, 68-75
15. Nariki et al. (2016). "Development of High-Performance QMG Bulk Magnets for High Magnetic Field Engineering Applications" IEEE Transactions on Applied Superconductivity, 26(3), 1-4

What is claimed is:

1. A method for charging a superconductor bulk magnet by field-cooling using a magnet charger system, wherein the magnet charger system comprises a background charger magnet and a field adjustment unit,
   wherein the superconductor bulk magnet comprises a bulk magnet bore, wherein the bulk magnet bore contains a sample volume,
   wherein the background charger magnet comprises a charger bore, wherein the superconductor bulk magnet is arranged within the charger bore, wherein the background charger magnet and the field adjustment unit are arranged radially outside the bulk magnet bore, and
   wherein the superconductor bulk magnet has a critical temperature $T_c$;
   said method comprising:
   step a) charging the magnet charger system to thereafter generate a first magnetic field in the sample volume, wherein the superconductor bulk magnet has a temperature T, with $T > T_c$;
   step b) cooling the superconductor bulk magnet to a temperature $T < T_c$;
   step c) discharging the magnet charger system, which inductively charges the superconductor bulk magnet, such that the superconductor bulk magnet traps a second magnetic field in the sample volume;
   before said step a), determining a correlation between a magnetic field applied by the magnet charger system from outside the superconductor bulk magnet and a resulting magnetic field trapped by the superconductor bulk magnet at least approximately in the sample volume, in said step a), setting the field adjustment unit such that the first magnetic field generated by the magnet charger system in the sample volume comprises a homogeneous magnetic field component and at least one non-homogeneous magnetic field component,
   wherein the at least one non-homogeneous field component is chosen, using the correlation, such that the second magnetic field of said step c) has a higher homogeneity than the first magnetic field of said step a) in the sample volume, wherein the correlation is chosen with a linear function for each applied non-homogeneous magnetic field component comprised in the first magnetic field and to be adjusted by the field adjustment unit, wherein each linear function is defined by a slope and an offset, and correlates a component strength value of the magnetic field applied with a corresponding component strength value of the magnetic field trapped for the non-homogeneous magnetic field component, and wherein said determining of the correlation includes at least determining the offset for each linear function by calculation and/or by measurement.

2. Method according to claim 1, wherein, for at least a majority of the applied non-homogeneous magnetic field components comprised in the first magnetic field and adjusted by the field adjustment unit, a corresponding applied component strength value of the first magnetic field is larger in absolute value than is a corresponding trapped component strength value in the second magnetic field.

3. Method according to claim 2, wherein, for each of the applied non-homogeneous magnetic field components comprised in the first magnetic field and adjusted by the field adjustment unit, the corresponding applied component strength value of the first magnetic field is larger in absolute value than is the corresponding trapped component strength value in the second magnetic field.

4. Method according to claim 1, wherein the at least one non-homogeneous magnetic field component of the first magnetic field is one or a plurality of gradient components of the first magnetic field.

5. Method according to claim 4, wherein the field adjustment unit comprises a plurality of field adjustment coils, allowing a direct adjustment of one or a plurality of individual gradient components.

6. Method according to claim 4, wherein the gradient components are associated with first or higher order spherical harmonics.

7. Method according to claim 5, wherein the field adjustment unit is chosen with a field adjustment coil or set of field adjustment coils for each gradient component.

8. Method according to claim 1, wherein, for at least approximately determining the correlation, before a cycle of said steps a), b) and c), at least one preparatory cycle of steps is applied, with each preparatory cycle of said steps comprising:

step a') charging the magnet charger system, such that said charging generates a first provisional magnetic field in the sample volume, wherein a magnetic field profile of the first provisional magnetic field is measured or calculated, wherein the superconductor bulk magnet has a temperature T, with $T>T_c$;

step b') cooling the superconductor bulk magnet to a temperature $T<T_c$;

step c') discharging the magnet charger system, which inductively charges the superconductor bulk magnet, such that the superconductor bulk magnet traps a second provisional magnetic field in the sample volume, wherein a magnetic field profile of the second provisional magnetic field is measured.

9. Method according to claim 8, wherein:

during said step a'), a respective applied component strength value for each of the at least one non-homogeneous magnetic field component to be adjusted by the field adjustment unit is determined from the measured or calculated magnetic field profile of the first provisional magnetic field, and during said step c'), a respective trapped component strength value for each of the at least one non-homogeneous magnetic field component to be adjusted by the field adjustment unit is determined from the measured magnetic field profile of the second provisional magnetic field.

10. Method according to claim 9, wherein:

during a next cycle of said steps a), b), c) or during a next preparatory cycle of said steps a'), b'), c'), in a respective next step a) or next step a'), the field adjustment unit is set such that a respective non-homogeneous magnetic field component of the first magnetic field to be adjusted by the field adjustment unit is chosen with a next applied component strength value being the applied component strength value of said previous step a') minus the trapped component strength value of the previous preparatory cycle of steps.

11. Method according to claim 8, wherein, in said step c), a magnetic field profile of the second magnetic field is measured, wherein, in each said step c') and said step c), the homogeneity of the measured second provisional magnetic field or the second magnetic field in the sample volume is compared to a predefined homogeneity threshold, and when the homogeneity of the measured second provisional magnetic field is worse than the homogeneity threshold in said step c'), then another preparatory cycle of said steps a'), b'), c') or another cycle of said steps a), b) and c) is performed, and when the homogeneity of the measured second magnetic field is equal to or better than the homogeneity threshold in said step c), then the second magnetic field in the sample volume is retained, and the method ends.

12. Method according to claim 8, wherein the magnetic field profile of the first provisional magnetic field is measured or calculated from electric currents applied to the magnet charger system.

13. Method according to claim 1, wherein, for at least approximately determining the correlation, before a cycle of said steps a), b) and c), a magnetic field trapping behavior of the magnet charger system and the superconductor bulk magnet is calculated in advance, taking into account at least a geometry of the magnet charger system or a magnetic field of the magnet charger system, and a geometry of the superconductor bulk magnet.

14. Method according to claim 13, wherein the calculation of the magnetic field trapping behavior includes, for each respective at least one non-homogeneous magnetic field component to be adjusted by the field adjustment unit, determining a target component strength value to be applied in the first magnetic field in order to obtain a desired trapped component strength value in the second magnetic field, and in a following cycle of said steps a), b), c) or in a following preparatory cycle of said steps a'), b), c'), the field adjustment unit is set such that the first magnetic field generated by the magnet charger system in the sample volume comprises the respective non-homogeneous magnetic field component with an applied component strength value corresponding to the determined target component strength value.

15. Method according to claim 13, wherein the advance calculation comprises an advance numerical simulation.

16. Method according to claim 14, wherein the desired trapped component strength value in the second magnetic field is zero.

17. Method according to claim 1, wherein for each of the linear functions, the slope is chosen as 1 or between 0.95 and 1, or the slope is determined by calculation and/or measurement.

18. Method according to claim 17, wherein the slope is determined by calculation and/or measurement to be smaller than 1.

19. Method according to claim 1, wherein the field adjustment unit comprises a plurality of field adjustment coils, the field adjustment coils having a maximum axial extension $L_{adjust}$ which is larger than a maximum axial extension $L_{bulk}$ of the superconductor bulk magnet, and further a maximum radial extension $R_{adjust}$ which is larger than 1.5 times the maximum radial extension $R_{bulk}$ of the superconductor bulk magnet.

20. Method according to claim 19, wherein:

the maximum axial extension $L_{adjust}$ is larger than twice the axial extension $L_{bulk}$ of the superconductor bulk magnet, and the maximum radial extension $R_{adjust}$ is larger than twice the maximum radial extension $R_{bulk}$ of the superconductor bulk magnet.

21. Method according to claim 1, wherein the magnet charger system is chosen with a superconducting background charger magnet, arranged in a charger cryostat.

22. Method according to claim 21, wherein the field adjustment unit is chosen with superconducting field adjustment coils arranged inside the charger cryostat.

23. Method according to claim 22, wherein the field adjustment coils are arranged radially outside the superconducting background charger magnet.

24. Method according to claim 1, wherein the superconductor bulk magnet is attached to a cooling stage contacting the superconductor bulk magnet at one axial end, and wherein the at least one non-homogeneous magnetic field component comprises a gradient component associated with the z spherical harmonic of the first magnetic field adjusted by the field adjustment unit.

25. Method according to claim 1, wherein the superconductor bulk magnet is chosen with a cylinder jacket shape having a constant wall thickness, and wherein the at least one non-homogeneous magnetic field component comprises a gradient component associated with the $z^2$ spherical harmonic of the first magnetic field adjusted by the field adjustment unit.

* * * * *